United States Patent
Wang et al.

(10) Patent No.: US 12,471,122 B2
(45) Date of Patent: Nov. 11, 2025

(54) METHOD AND APPARATUS FOR NOTIFYING SIDELINK ASSISTANCE INFORMATION, AND ELECTRONIC DEVICE

(71) Applicant: VIVO MOBILE COMMUNICATION CO., LTD., Dongguan (CN)

(72) Inventors: Huan Wang, Dongguan (CN); Zichao Ji, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 392 days.

(21) Appl. No.: 18/092,193

(22) Filed: Dec. 30, 2022

(65) Prior Publication Data
US 2023/0147087 A1   May 11, 2023

Related U.S. Application Data

(63) Continuation of application No. PCT/CN2021/103518, filed on Jun. 30, 2021.

(30) Foreign Application Priority Data

Jul. 2, 2020 (CN) .......................... 202010634680.8

(51) Int. Cl.
*H04W 72/40* (2023.01)
(52) U.S. Cl.
CPC .................................. *H04W 72/40* (2023.01)
(58) Field of Classification Search
CPC ...................................................... H04W 72/40
See application file for complete search history.

(56) References Cited

U.S. PATENT DOCUMENTS

| 12,170,999 B2 * | 12/2024 | Zhang ................... H04L 1/1858 |
| 2020/0045719 A1 * | 2/2020 | Wang ................. H04W 72/0446 |
| 2022/0393805 A1 * | 12/2022 | Guo ...................... H04L 1/1854 |

(Continued)

FOREIGN PATENT DOCUMENTS

| CN | 106792885 A | 5/2017 |
| CN | 108886769 A | 11/2018 |
| CN | 109391922 A | 2/2019 |

(Continued)

OTHER PUBLICATIONS

Extended European Search Report issued in related European Application No. 21832553.8, mailed Dec. 7, 2023, 11 pages.

(Continued)

*Primary Examiner* — Won Tae C Kim
(74) *Attorney, Agent, or Firm* — IPX PLLC

(57) ABSTRACT

A method and an apparatus for notifying sidelink assistance information, and an electronic device are provided. The method for notifying sidelink assistance information is performed by a first terminal and includes: sending the sidelink assistance information to a second terminal when a preset trigger condition is satisfied. The trigger condition includes at least one of the following: the first terminal detects a transmission resource reserved by the second terminal; or the first terminal detects that a transmission resource of the second terminal and a transmission resource of the first terminal overlap.

20 Claims, 4 Drawing Sheets

Send sidelink assistance information to a second terminal if a preset trigger condition is satisfied or trigger signaling sent by the second terminal is received, where the trigger condition includes at least one of the following:
a first terminal determines that demodulation fails;
a first terminal detects a transmission resource reserved by the second terminal;
a first terminal detects that a transmission resource of the second terminal and a transmission resource of the first terminal overlap; or
a constraint condition agreed in a protocol, configured or pre-configured by a control node, or sent by the second terminal is satisfied

101

(56) References Cited

U.S. PATENT DOCUMENTS

2023/0081131 A1 * 3/2023 Selvanesan .......... H04W 72/20
                                                    370/329

FOREIGN PATENT DOCUMENTS

| | | |
|---|---|---|
| CN | 109891967 A | 6/2019 |
| CN | 110099366 A | 8/2019 |
| CN | 110149698 A | 8/2019 |
| CN | 110267226 A | 9/2019 |
| CN | 110891289 A | 3/2020 |
| CN | 110944352 A | 3/2020 |
| CN | 110944390 A | 3/2020 |
| CN | 110944394 A | 3/2020 |
| CN | 110972276 A | 4/2020 |
| CN | 110972290 A | 4/2020 |
| CN | 111132329 A | 5/2020 |
| CN | 111278050 A | 6/2020 |
| EP | 4132160 A1 | 2/2023 |
| KR | 2020047928 A | 5/2020 |
| WO | 2018053808 A1 | 3/2018 |
| WO | 2019028276 A1 | 2/2019 |
| WO | 2020067675 A1 | 4/2020 |
| WO | WO-2021237663 A1 * | 12/2021 |

OTHER PUBLICATIONS

LG Electronics: "Discussion on resource allocation mechanism for NR V2X", 3GPP Draft; R1-1901933, Feb. 2019, 12 pages.

Intel Corporation: "Resource Allocation Schemes for NR V2X Sidelink Communication" 3GPP Draft, R1-1812491, Nov. 2018, 15 pages.

International Search Report issued in corresponding International Application No. PCT/CN2021/103518, mailed Sep. 9, 2021, 4 pages.

First Office Action issued in related Chinese Application No. 202010634680.8, mailed Jun. 16, 2022, 15 pages.

CATT, Addtion the allowed MCS values for V2X sidelink communication (option 1+2), 3GPP TSG-RAN WG2_RL2, R2-1802135, Feb. 14, 2018, 6 pages.

Intel Corporation, Sidelink resource allocation for unicast vs broadcast operation, 3GPP TSG-RAN WG2_RL2, R2-1814066, Sep. 28, 2018, 3 pages.

* cited by examiner

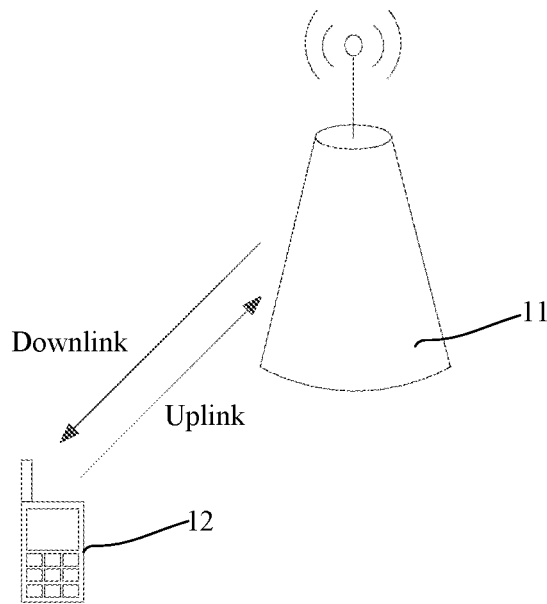

FIG. 1

Send sidelink assistance information to a second terminal if a preset trigger condition is satisfied or trigger signaling sent by the second terminal is received, where the trigger condition includes at least one of the following:
a first terminal determines that demodulation fails;
a first terminal detects a transmission resource reserved by the second terminal;
a first terminal detects that a transmission resource of the second terminal and a transmission resource of the first terminal overlap; or
a constraint condition agreed in a protocol, configured or pre-configured by a control node, or sent by the second terminal is satisfied      ——— 101

FIG. 2

Send trigger signaling to a first terminal, to trigger the first terminal to send sidelink assistance information to a second terminal    ——— 201

FIG. 3

METHOD AND APPARATUS FOR NOTIFYING SIDELINK ASSISTANCE INFORMATION, AND ELECTRONIC DEVICE

CROSS-REFERENCE TO RELATED APPLICATIONS

This application is a continuation of International Application No. PCT/CN2021/103518, filed Jun. 30, 2021, which claims priority to Chinese Patent Application No. 202010634680.8, filed Jul. 2, 2020. The entire contents of each of the above-referenced applications are expressly incorporated herein by reference.

TECHNICAL FIELD

This application relates to the field of communications technologies, and in particular, to a method and an apparatus for notifying sidelink assistance information, and an electronic device.

BACKGROUND

Due to hardware constraints and scene limitations, the reliability of sidelink transmission is relatively low. To improve the reliability of the sidelink transmission, a receiving terminal may suggest some assistance information to a transmitting terminal, to assist the transmitting terminal in resource selection and/or adjustment of a transmission parameter of the transmitting terminal. However, how the receiving terminal sends the assistance information to the transmitting terminal is not stipulated in the related art.

SUMMARY

Embodiments of this application provide a method and an apparatus for notifying sidelink assistance information, and an electronic device, which can improve the reliability of sidelink transmission.

According to a first aspect, an embodiment of this application provides a method for notifying sidelink assistance information, where the method is applied to a first terminal and includes:
   sending the sidelink assistance information to a second terminal if a preset trigger condition is satisfied or trigger signaling sent by the second terminal is received, where the trigger condition includes at least one of the following:
   the first terminal determines that demodulation fails;
   the first terminal detects a transmission resource reserved by the second terminal;
   the first terminal detects that a transmission resource of the second terminal and a transmission resource of the first terminal overlap; or
   a constraint condition specified in a protocol, configured or pre-configured by a control node, or sent by the second terminal is satisfied.

According to a second aspect, an embodiment of this application provides a method for notifying sidelink assistance information, where the method is applied to a second terminal and includes:
   sending trigger signaling to a first terminal, to trigger the first terminal to send the sidelink assistance information to the second terminal.

According to a third aspect, an embodiment of this application provides an apparatus for notifying sidelink assistance information, where the apparatus is applied to a first terminal and includes:
   a first sending module, configured to send the sidelink assistance information to a second terminal if a preset trigger condition is satisfied or trigger signaling sent by the second terminal is received, where the trigger condition includes at least one of the following:
   the first terminal determines that demodulation fails;
   the first terminal detects a transmission resource reserved by the second terminal;
   the first terminal detects that a transmission resource of the second terminal and a transmission resource of the first terminal overlap; or
   a constraint condition specified in a protocol, configured or pre-configured by a control node, or sent by the second terminal is satisfied.

According to a fourth aspect, an embodiment of this application provides an apparatus for notifying sidelink assistance information, where the apparatus is applied to a second terminal and includes:
   a second sending module, configured to send trigger signaling to a first terminal, to trigger the first terminal to send the sidelink assistance information to the second terminal.

According to a fifth aspect, an embodiment of this application further provides an electronic device, including a processor, a memory, and a program or an instruction stored in the memory and capable of running on the processor, where when the program or the instruction is executed by the processor, steps of the foregoing method are implemented.

According to a sixth aspect, an embodiment of this application provides a readable storage medium, where the readable storage medium stores a program or an instruction, and the program or the instruction is executed by a processor to implement the steps of the foregoing method.

According to a seventh aspect, an embodiment of this application provides a chip, where the chip includes a processor and a communication interface, where the communication interface is coupled to the processor, and the processor is configured to run a program or an instruction to implement the method according to the first aspect or the second aspect.

In this embodiment of this application, after the first terminal receives the trigger signaling sent by the second terminal or the preset trigger condition is satisfied, the first terminal sends the sidelink assistance information to the second terminal. This way, when the second terminal needs the sidelink assistance information, the first terminal can send the sidelink assistance information to the second terminal, to assist the second terminal in resource selection and/or adjustment of a transmission parameter, thereby improving the reliability of sidelink transmission.

BRIEF DESCRIPTION OF DRAWINGS

To describe the technical solutions in the embodiments of this application more clearly, the following briefly describes the accompanying drawings of this application. Apparently, the accompanying drawings in the following descriptions show merely some embodiments of this application, and a person of ordinary skill in the art may still derive other drawings from these accompanying drawings without creative efforts.

FIG. 1 is a schematic diagram of a wireless communications system;

FIG. 2 is a schematic flowchart of a method for notifying sidelink assistance information by a first terminal side according to an embodiment of this application;

FIG. 3 is a schematic flowchart of a method for notifying sidelink assistance information by a second terminal side according to an embodiment of this application;

DETAILED DESCRIPTION

Figure 4:
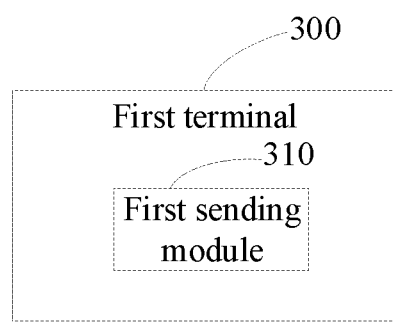
FIG. 4 is a schematic structural diagram of an apparatus for notifying sidelink assistance information by a first terminal side according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in such way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

The technology described herein is not limited to a Long Term Evolution (LTE)/LTE-Advanced (LTE-A) system, and may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often interchangeably used. The CDMA system can implement radio technologies such as CDMA2000 and Universal Terrestrial Radio Access (UTRA). The UTRA includes wideband CDMA (WCDMA) and other CDMA variants. A TDMA system may implement a radio technology such as the Global System for Mobile Communication (GSM). The OFDMA system can implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. The UTRA and E-UTRA are parts of a Universal Mobile Telecommunications System (UMTS). The LTE and more advanced LTE (for example, LTE-A) are new UMTS versions using E-UTRA. The UTRA, E-UTRA, UMTS, LTE, LTE-A, and GSM are described in documents from an organization named "3rd Generation Partnership Project" (3GPP). The CDMA2000 and UMB are described in the documents of the organization named the "3rd Generation Partnership Project 2" (3GPP2). The technologies described in this specification may be used in the systems and radio technologies mentioned above, and may also be used in another system and radio technology. However, an NR system is described in the following description for illustrative purposes, and an NR terminology is used in most of the following description, although these technologies can also be applied to applications other than the NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal-side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in the embodiments of this application. The network side device 12 may be a base station or a core network, where the foregoing base station may be a base station of a 5G or later release (for example: a gNB or a 5G NR NB), or base stations (for example: an eNB, a WLAN access point, or another access point) in other communications systems, or a location server (such as an E-SMLC or LMF (Location Manager Function)). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or another proper term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

There are two resource allocation modes in the new radio (NR) sidelink (SL), one is a resource allocation mode based on base station scheduling (mode 1), and the other is a resource allocation mode based on autonomous resource selection of a User Equipment (UE) (mode 2). With regard to the resource allocation mode based on base station scheduling, a sidelink resource used by the UE for data transmission is determined by the base station, and a transmitting terminal (TX) UE is notified by downlink signaling. With regard to the resource allocation mode based on autonomous resource selection of a UE, the UE selects an available transmission resource from a (pre-) configured resource pool, and before resource selection, the UE performs channel monitoring, selects a resource set with less interference according to a result of the channel monitoring, and then randomly selects a resource for transmission from the resource set.

A exemplary working manner in mode 2 is as follows. 1) After the resource selection is triggered, the TX UE first determines a resource selection window, a lower boundary of the resource selection window is at a T1 time after the resource selection is triggered, and an upper boundary of the resource selection window is at a T2 time after the resource selection is triggered, where T2 is a value selected by the UE in a packet delay budget (PDB) transmitted in a Transport Block (TB) of the UE, and T2 is not earlier than T1. 2) Before resource selection, the UE needs to determine a candidate resource set for resource selection, and compare a Reference Signal Received Power (RSRP) measured on a resource in the resource selection window with a corresponding RSRP threshold (threshold), and if the RSRP is greater than the RSRP threshold, the resource will be excluded and cannot be included in the candidate resource set. After resource exclusion, remaining resources in the resource selection window form the candidate resource set. Resources in the candidate resource set account for at least 20% of resources in the resource selection window. If the resources in the candidate resource set account for less than 20% of the resources in the resource selection window, the RSRP threshold needs to be increased according to a step-by-step value (3 dB), and then the resource exclusion is performed until no less than 20% of the resources can be selected. 3) After the candidate resource set is determined, the UE randomly selects a transmission resource in the candidate resource set. In addition, the UE can reserve a transmission resource for a next transmission in this transmission.

The following scenarios exist in sidelink transmission:

Scenario 1: Due to the limitation on half-duplex, a receiving terminal (RX UE) cannot perform transmission and receiving simultaneously, and a transmission resource selected by a transmitting terminal (TX UE) may affect the reliability of transmission between the RX UE and the TX UE.

Scenario 2: Due to a defect in resource selection in mode 2, resource selection by different TX UEs may conflict each other, and the assistance information can also partially resolve a conflict problem. The defect is caused by at least inaccuracy of resource monitoring (for example, results of channel monitoring by the TX UE and RX UE are inconsistent) and randomness of resource selection during resource selection in mode 2.

Scenario 3: When the RX UE receives transmission of multiple Physical Sidelink Shared Channel (PSSCH) from the TX UE and feeds back Physical Sidelink Feedback channel (PSFCH) for the transmission of multiple PSSCHs, if the PSFCHs corresponding to the transmission of the PSSCHs fall in a same PSFCH occasion, due to limitation on UE capability and/or power control, multiple PSFCHs cannot be sent simultaneously, so that transmission reliability cannot be ensured. The assistance information can assist in avoiding this problem.

Embodiments of this application provide a method and an apparatus for notifying sidelink assistance information, and an electronic device, which can improve reliability of sidelink transmission.

An embodiment of this application provides a method for notifying sidelink assistance information, applied to a first terminal. As shown in FIG. 2, the method includes:

Step 101: Send the sidelink assistance information to a second terminal if a preset trigger condition is satisfied or trigger signaling sent by the second terminal is received, where the trigger condition includes at least one of the following:
  the first terminal determines that demodulation fails;
  the first terminal detects a transmission resource reserved by the second terminal;
  the first terminal detects that a transmission resource of the second terminal and a transmission resource of the first terminal overlap, where the overlapping may mean that a time domain resource and a frequency domain resource overlap completely or partially, or time domain resources overlap completely or partially; or
  a constraint condition specified in a protocol, configured or pre-configured by a control node, or sent by the second terminal is satisfied.

In this embodiment of this application, after the first terminal receives the trigger signaling sent by the second terminal or the preset trigger condition is satisfied, the first terminal sends the sidelink assistance information to the second terminal. This way, when the second terminal needs the sidelink assistance information, the first terminal can send the sidelink assistance information to the second terminal, to assist the second terminal in resource selection and/or adjustment of a transmission parameter, thereby improving reliability of sidelink transmission.

The first terminal may be a receiving terminal and the second terminal may be a transmitting terminal.

In some embodiments, the first terminal may send the sidelink assistance information to the second terminal after determining that the demodulation fails. The first terminal may send the sidelink assistance information to the second terminal at a preset time position after a time position at which the preset trigger condition is satisfied. Maximum time duration between the preset time position and the time position at which the preset trigger condition is satisfied is x and/or minimum time duration therebetween is y, where x and y are values specified in a protocol, or configured or pre-configured by the control node, and units of x and y may be milliseconds, time slots, sub-time slots, or the like.

For example, the first terminal needs to feed back the sidelink assistance information within a time limit x after a relative time position that a PSCCH and/or PSSCH with the demodulation failure is located, and the time limit may be a time range, an upper delay limit, or a lower delay limit.

In some embodiments, that the first terminal determines that demodulation fails includes at least one of the following:
  demodulation of initial transmission of a physical sidelink control channel PSCCH and/or a physical sidelink shared channel PSSCH of the second terminal fails;
  demodulation of retransmission of a PSCCH and/or PSSCH of the second terminal fails;
  demodulation of a specific PSCCH and/or PSSCH fails;
  demodulation of a transmission resource of a specific transport block TB fails; or
  demodulation of a resource with a specific sidelink grant SL grant fails.

In some embodiments, the first terminal may send the sidelink assistance information to the second terminal after determining that demodulation fails for n times, where n is a positive integer, and n is a value specified in a protocol or configured or pre-configured by the control node.

In some embodiments, the first terminal may feed back the sidelink assistance information to the second terminal after the first terminal detects a transmission resource (such as the PSCCH and/or PSSCH resource) reserved by the second terminal. For example, if the first terminal determines that the second terminal reserves a resource for transmitting information to the first terminal, the first terminal feeds back the sidelink assistance information to the second terminal. In addition, the first terminal needs to feed back the sidelink assistance information within x time limit before or after a relative time position that the reserved PSCCH or PSSCH is located, where the time limit may be a time range, an upper delay limit, or a lower delay limit; and x may be a value specified in a protocol or configured or pre-configured by the control node.

In some embodiments, the first terminal may feed back the sidelink assistance information to the second terminal when the first terminal detects that a transmission resource (such as the reserved PSCCH or PSSCH resource, or a PSFCH resource associated with the PSCCH or PSSCH) of the second terminal is at a transmission moment of the first terminal. In addition, the first terminal needs to feed back the sidelink assistance information within x time limit before or after a relative time position that the transmission resource is located, where the time limit may be time range, an upper delay limit, or a lower delay limit; and x may be a value specified in a protocol or configured or pre-configured by the control node.

In some embodiments, the constraint condition may be specified in a protocol, configured or pre-configured by the control node, or transmitted by the second terminal to the first terminal. The constraint condition may include a sending frequency and/or sending interval at which the sidelink assistance information is sent. For example, a timer is enabled after triggering of transmission of the sidelink assistance information is limited or the sidelink assistance information is transmitted once, next transmission can be triggered after time out, and the maximum/minimum number of times for transmission within a unit time is limited. If the constraint condition is configured or pre-configured by the control node, the constraint condition is for at least one of the following objects: a resource pool (per pool), a bandwidth part BWP (per BWP), or a UE (per UE).

In some embodiments, a channel carrying the sidelink assistance information includes at least one of the following:
  a PSCCH;
  a PSSCH;
  a PSFCH; or
  a dedicated sidelink physical channel, where a parameter of the sidelink physical channel includes at least one of the following: an occasion when the channel appears, a time domain resource of the channel, a frequency domain resource of the channel, or a code domain resource of the channel, and the dedicated sidelink physical channel may be a sidelink physical channel customized by the terminal.

For example, a channel resource carrying the trigger signaling may be a standalone PSCCH (that is, a PSCCH not associated with a PSSCH), a PSCCH or PSSCH with the smallest transmission granularity (that is, a PSSCH or PSCCH with one sub-channel (sub-channel) and one slot (slot)), and the like.

The occasion when the channel appears may be a time for automatic gain control (AGC) agreed, configured, or pre-configured for several time domain resources (such as several symbols or slots) before or after the occasion when the channel appears.

In addition, channel resources of the sidelink physical channel may also be numbered. For example, the channel resources may be numbered according to a time domain, frequency domain, or code domain sequence of the channel resources as specified in a protocol or configured or pre-configured by the control node.

The dedicated sidelink physical channel may be a new PSFCH format, and may also carry a Hybrid Automatic Repeat Request (HARQ), Channel State Information (CSI), sidelink assistance information, and the like.

In some embodiments, the method also includes that the first terminal obtains a transmission resource for the sidelink assistance information, including any one of the following:
  the first terminal obtains a transmission resource allocated by the control node;
  the first terminal selects a transmission resource, and the resource selection mode for the PSCCH and/or PSSCH may be reused for the resource selection, that is, the mode 2 and a subsequently possibly enhanced mode 2;
  the first terminal obtains a transmission resource allocated by the second terminal; or
  the first terminal obtains a reserved transmission resource.

The transmission resource allocated by the second terminal may be indicated to the first terminal through resource allocation information, where the resource allocation information is carried in at least one of the following:
  Sidelink Control Information (SCI);
  Sidelink Feedback Control Information (SFCI);
  a Radio Resource Control (RRC) message;
  a Media Access Control (MAC) Control Element (CE); or
  information carried by the dedicated sidelink physical channel.

In an example, when the second terminal triggers the first terminal to feed back the sidelink assistance information, the second terminal may directly allocate a resource to the first terminal,
  where a transmission resource for the sidelink assistance information is associated with a transmission resource (a PSCCH or PSSCH resource) of the second terminal. For example, there is a one-to-one, one-to-many, many-to-one, or many-to-many mapping relationship, or the like as specified in a protocol. In addition, the resource may simultaneously carry CSI, where the CSI may include a Channel Quality Indicator (CQI), a Precoding Matrix Indicator (PMI), Rank Indicator (RI), an RSRP, or the like.

In some embodiments, that the first terminal selects a transmission resource includes:
  obtaining transmission packet information before resource selection, where the transmission packet information includes at least one of the following:
  packet delay budget PDB information of a transmission packet; and
  a priority of a transmission packet.

The obtaining transmission packet information includes obtaining transmission packet information specified in a protocol, configured or pre-configured by the control node, or obtained according to a rule specified in a protocol.

An embodiment of this application provides a method for notifying sidelink assistance information, applied to a second terminal. As shown in FIG. 3, the method includes:

Step 201: Send trigger signaling to a first terminal, to trigger the first terminal to send the sidelink assistance information to the second terminal.

In some embodiments, after the second terminal sends the trigger signaling to the first terminal, to trigger the first terminal for sending, the first terminal sends the sidelink assistance information to the second terminal, and a channel carrying the trigger signaling includes at least one of the following:
- a PSCCH;
- a PSSCH;
- a physical sidelink feedback channel PSFCH; or
- a dedicated sidelink physical channel, where a parameter of the sidelink physical channel includes at least one of the following: an occasion when the channel appears, a time domain resource of the channel, a frequency domain resource of the channel, or a code domain resource of the channel.

In addition, the trigger signaling may only be used to indicate that the second terminal has a new transport block (TB) for sending, instead of directly triggering the first terminal to send the sidelink assistance information. For example, a channel resource carrying the trigger signaling may be a standalone PSCCH (that is, a PSCCH not associated with a PSSCH), a PSCCH or PSSCH with the smallest transmission granularity (that is, a PSSCH or PSCCH with one sub-channel and one slot), and the like.

The occasion when the channel appears may be a time of automatic gain control (AGC) agreed, configured, or pre-configured for several time domain resources (such as several symbols or slots) before or after the occasion when the channel appears.

In addition, channel resources of the sidelink physical channel may also be numbered. For example, the channel resources may be numbered according to a time domain, frequency domain and/or code domain sequence of the channel resources as specified in a protocol or configured or pre-configured by the control node.

Figure 7:
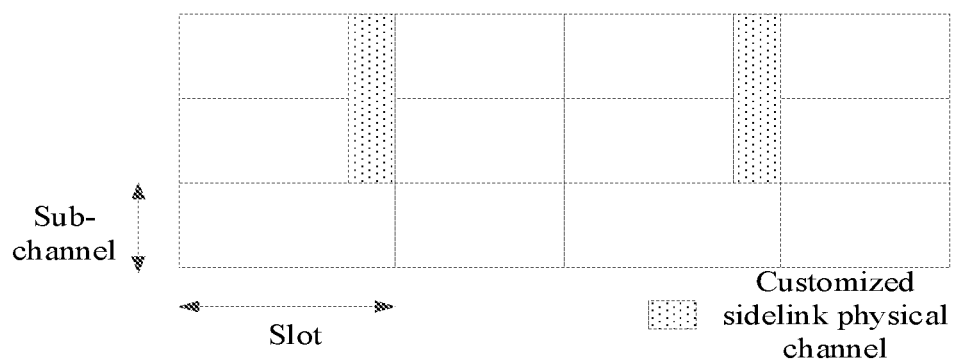
FIG. 7 is a schematic diagram of a newly defined sidelink physical channel according to an embodiment of this application.

In a specific example, as shown in FIG. 7, for a newly defined SL physical channel (such as a PSxCH), channel definition involves at least one of the following parameter items.

(1) An occasion when a channel appears,
including a period of the channel, an offset (for example, an offset relative to SFN #0, DFN #0, or a start position of a resource pool) of the channel, and the like. The parameter item may be a parameter item specified in a protocol or configured or pre-configured by a control node. For example, it is agreed that the occasion when a channel appears is the same as a PSFCH occasion, or the occasion when a channel appears is configured per pool or per BWP.

(2) A time domain resource of a channel, including a length or granularity of the time domain resource, such as the number of symbols. The parameter item is a parameter item specified in a protocol or configured or pre-configured by a control node. For example, it is agreed that the occasion when a channel appears is the same as the number of time domain resources of the PSFCH or has any fixed length, or is configured per pool or per BWP.

(3) A frequency domain resource of a channel, including granularity (such as a physical resource block (PRB), a sub-channel, or the number of resources, or the like). The parameter item is a parameter item specified in a protocol or configured or pre-configured by a control node. A configuration manner may include configuring a frequency domain resource in a "Bitmap" or "start position+length" manner, or a frequency domain resource of the PSxCH is obtained by removing a PSFCH resource on a PSFCH occasion, or a frequency domain resource of the PSxCH is obtained by removing a PSFCH resource on a PSFCH occasion and configuring any one or more other channel resources.

(4) A code domain resource of a channel, code domain resources may be distinguished by cyclic shift, u-v, root sequence, or the like, and the parameter item may be a parameter item specified in a protocol or configured or pre-configured by a control node.

A second terminal may obtain a transmission resource for trigger signaling on a carrying channel, including at least one of the following:
- the second terminal obtains a transmission resource allocated by a control node;
- the second terminal selects a transmission resource, where the resource selection mode for the PSCCH and/or PSSCH may be reused for the resource selection, that is, the mode 2 and a subsequently possibly enhanced mode 2; or
- the second terminal continuously transmits or reserves a transmission resource from a group of selected resources.

That the second terminal selects a transmission resource includes any one of the following:
- using the existing resource selection mode for the PSCCH or PSSCH;
- the second terminal monitors a channel resource, obtains channel resources determined to be in an idle state, and selects the transmission resource from the resources in an idle state; or
- the second terminal selects the transmission resource according to a corresponding identifier of a UE group and/or a UE pair. For example, a resource index mod (partial) identifier (ID), where the ID includes a source identifier (Source ID), a destination identifier (destination ID), and a member-ID in a UE group.

In some embodiments, that the second terminal monitors a channel resource includes monitoring one group of or multiple groups of channel resources, further including at least any one of the following: the group of channel resources includes channel resources on continuously multiple sidelink physical channel occasions; or inclusion of channel resources included in the group of channel resources has a characteristic as specified in a protocol or configured or pre-configured by the control node. For example, the same channel resources on continuously multiple channel occasions are indexed as a group of channel resources; and resources with the same time domain resource and/or frequency domain resource and/or code domain resource on the continuously multiple channel occasions are included in a group of channel resources.

In some embodiments, a channel resource is determined to be in the idle state according to at least one of the following:
- for one resource in a group of channel resources, before determining, on n transmission occasions or continuous n transmission occasions on the group of channel resources, a measured reference signal received power RSRP and/or received signal strength indicator RSSI is less than a preset first threshold, where n is a positive integer;
- for one resource in a group of channel resources, before determining, on n transmission occasions or continuous n transmission occasions on the group of channel resources, the number or proportion of resources whose measured RSRP and/or RSSI is less than or equal to a preset second threshold is less than or equal to a preset third threshold; or
- it is monitored whether a resource is reserved and/or whether an RSRP and/or RSSI value measured on reservation information carrying the resource is less than or equal to a preset fourth threshold.

The n transmission occasions are specified in a protocol or configured or pre-configured by the control node;
the first threshold is specified in a protocol or configured or pre-configured by the control node;
the second threshold is specified in a protocol or configured or pre-configured by the control node;
the third threshold is specified in a protocol or configured or pre-configured by the control node; and
the fourth threshold is specified in a protocol or configured or pre-configured by the control node.

The 'before' includes at least before the moment for determining, before the trigger signaling is transmitted, or the like.

Figure 8:
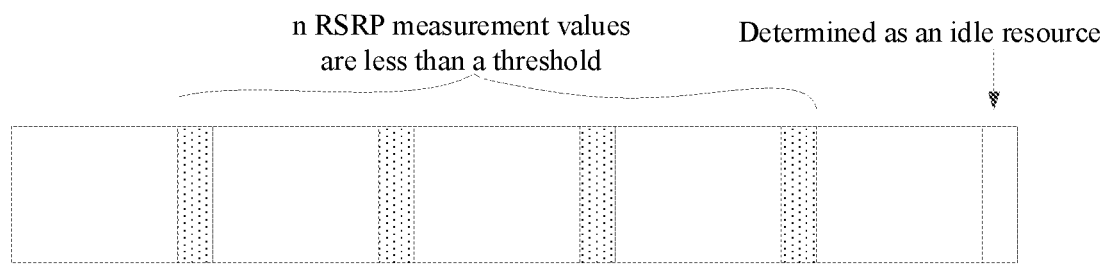
FIG. 8 is a schematic diagram for determining an idle resource according to an embodiment of this application.

In a specific example, as shown in FIG. 8, for one resource in a group of channel resources, before determining, on continuous n transmission occasions on the group of channel resources, the resource is determined as an idle resource if a measured reference signal received power RSRP is less than a threshold.

In some embodiments, that a second terminal selects the transmission resource from resources in the idle state includes:
selecting an idle resource as the transmission resource from multiple idle resources randomly and/or according to a predetermined rule.

Figure 9:
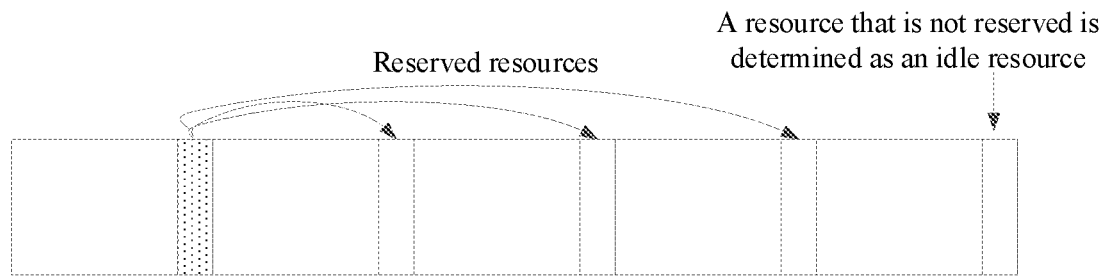
FIG. 9 is a schematic diagram for monitoring whether a resource is reserved according to an embodiment of this application.

In a specific example, as shown in FIG. 9, monitoring a channel resource includes monitoring whether a resource is reserved, or whether a RSRP or RSSI value measured on reservation information carrying the resource is less than or equal to a threshold, where the threshold includes a threshold specified in a protocol (obtained according to a predefined rule) or configured or pre-configured by the control node. If a result of the monitoring is 'yes', the resource is determined to be idle. That the second terminal selects a resource includes at least that the second terminal selects a resource from multiple idle resources randomly or according to a predetermined rule.

The second terminal may continuously transmit or reserve a transmission resource from a group of selected resources, for example, the second terminal may perform transmission or reservation for continuous m times, where m may be specified in a protocol or configured or pre-configured by the control node. For a reserved resource, resource reservation information may be carried in trigger signaling. For example, the reservation information indicates the number of times for which the second terminal has reserved resources, or indicates whether the second terminal is performing resource reservation. In addition, the resource may simultaneously carry channel state information (CSI) trigger signaling or HARQ feedback trigger signaling.

In some embodiments, joint coding or separate coding may be used for the trigger signaling.

In some embodiments, that the second terminal selects a transmission resource includes obtaining transmission packet information before resource selection, where the transmission packet information includes at least one of the following:
packet delay budget PDB information of a transmission packet; or
a priority of a transmission packet.

The obtaining transmission packet information includes obtaining transmission packet information specified in a protocol, configured or pre-configured by the control node, or obtained according to a rule specified in a protocol.

It should be noted that an executing body for the method for notifying the sidelink assistance information provided in this embodiment of this application may be an apparatus for notifying the sidelink assistance information, or a module that is in the apparatus for notifying the sidelink assistance information and that is configured to load the method for notifying the sidelink assistance information. In this embodiment of this application, for example, the method for notifying the sidelink assistance information provided in this embodiment of this application is described by taking that the apparatus for notifying the sidelink assistance information loads the method for notifying the sidelink assistance information as an example.

The apparatus for notifying the sidelink assistance information in this embodiment of this application is applied to a first terminal 300, and as shown in FIG. 4, the apparatus includes:
a first sending module 310, configured to send the sidelink assistance information to a second terminal if a preset trigger condition is satisfied or trigger signaling sent by the second terminal is received, where the trigger condition includes at least one of the following:
the first terminal determines that demodulation fails;
the first terminal detects a transmission resource reserved by the second terminal;
the first terminal detects that a transmission resource of the second terminal and a transmission resource of the first terminal overlap; or
a constraint condition specified in a protocol, configured or pre-configured by a control node, or sent by the second terminal is satisfied.

In this embodiment of this application, after the first terminal receives the trigger signaling sent by the second terminal or the preset trigger condition is satisfied, the first terminal sends the sidelink assistance information to the second terminal. This way, when the second terminal needs the sidelink assistance information, the first terminal can send the sidelink assistance information to the second terminal, to assist the second terminal in resource selection and/or adjustment of a transmission parameter, thereby improving reliability of sidelink transmission.

In some embodiments, the first terminal may send the sidelink assistance information to the second terminal after determining that the demodulation fails. The first sending module 310 is configured to transmit the sidelink assistance information to the second terminal at a preset time position after a time position at which the preset trigger condition is satisfied. Maximum time duration between the preset time position and the time position at which the preset trigger condition is satisfied is x and/or minimum time duration therebetween is y, where x and y are values specified in a protocol, or configured or pre-configured by the control node, and units of x and y may be milliseconds, time slots, or sub-time slots. For example, the first terminal needs to feed back the sidelink assistance information within a time limit x after a relative time position that a PSCCH and/or PSSCH with the demodulation failure is located, and the time limit may be a time range, an upper delay limit, or a lower delay limit.

In some embodiments, that the first terminal determines that demodulation fails includes at least one of the following:
demodulation of initial transmission of a physical sidelink control channel PSCCH and/or a physical sidelink shared channel PSSCH of the second terminal fails;
demodulation of retransmission of a PSCCH and/or PSSCH of the second terminal fails;

demodulation of a specific PSCCH and/or PSSCH fails;
demodulation of a transmission resource of a specific transport block TB fails; or
demodulation of a resource with a specific sidelink grant SL grant fails.

In some embodiments, the first sending module 310 may send the sidelink assistance information to the second terminal after determining that demodulation fails for n times, where n is a positive integer, and n is a value specified in a protocol or configured or pre-configured by the control node.

In some embodiments, the first terminal may feed back the sidelink assistance information to the second terminal after the first sending module 310 detects a transmission resource (such as the PSCCH and/or PSSCH resource) reserved by the second terminal. For example, if the first terminal determines that the second terminal reserves a resource for transmitting information to the first terminal, the first terminal feeds back the sidelink assistance information to the second terminal. In addition, the first sending module 310 needs to feed back the sidelink assistance information within x time limit before or after a relative time position that the reserved PSCCH or PSSCH is located, where the time limit may be a time range, an upper delay limit, or a lower delay limit; and x may be a value specified in a protocol or configured or pre-configured by the control node.

In some embodiments, the first sending module 310 may feed back the sidelink assistance information to the second terminal when the first sending module detects that a transmission resource (such as the reserved PSCCH or PSSCH resource, or a PSFCH resource associated with the PSCCH or PSSCH) of the second terminal is at a transmission moment of the first terminal. In addition, the first sending module 310 needs to feed back the sidelink assistance information within x time limit before or after a relative time position that the transmission resource is located, where the time limit may be time range, an upper delay limit, or a lower delay limit; and x may be a value specified in a protocol or configured or pre-configured by the control node.

In some embodiments, the apparatus further includes:
an obtaining module, configured to obtain a constraint condition for sending the sidelink assistance information, where the constraint condition is specified in a protocol, configured or pre-configured by the control node, or sent by the second terminal, and the constraint condition includes a sending frequency and/or a sending interval at which the sidelink assistance information is sent. For example, a timer is enabled after triggering of transmission of the sidelink assistance information is limited or the sidelink assistance information is transmitted once, next transmission can be triggered after time out, and the maximum/minimum number of times for transmission within a unit time is limited. If the constraint condition is configured or pre-configured by the control node, the constraint condition is for at least one of the following objects: a resource pool (per pool), a bandwidth part BWP (per BWP), or a UE (per UE).

In some embodiments, a channel carrying the sidelink assistance information includes at least one of the following:
a PSCCH;
a PSSCH;
a PSFCH; or
a dedicated sidelink physical channel, where a parameter of the sidelink physical channel includes at least one of the following: an occasion when the channel appears, a time domain resource of the channel, a frequency domain resource of the channel, or a code domain resource of the channel.

For example, a channel resource carrying the trigger signaling may be a standalone PSCCH (that is, a PSCCH not associated with a PSSCH), a PSCCH or PSSCH with the smallest transmission granularity (that is, a PSSCH or PSCCH with one sub-channel and one slot), and the like.

The occasion when the channel appears may be a time for automatic gain control (AGC) agreed, configured, or pre-configured for several time domain resources (such as several symbols or slots) before or after the occasion when the channel appears.

In addition, channel resources of the sidelink physical channel may also be numbered. For example, the channel resources may be numbered according to a time domain, frequency domain, or code domain sequence of the channel resources as specified in a protocol or configured or pre-configured by the control node.

The dedicated sidelink physical channel may be a new PSFCH format, and may also carry a hybrid automatic repeat request (HARQ), channel state information (CSI), sidelink assistance information, and the like.

In some embodiments, the first sending module 310 is further configured to obtain the transmission resource for the sidelink assistance information, including any one of the following:
obtaining a transmission resource allocated by the control node, where the resource selection mode for the PSCCH and/or PSSCH may be reused for the resource selection, that is, the mode 2 and a subsequently possibly enhanced mode 2; or
selecting a transmission resource;
obtaining a transmission resource allocated by the second terminal; or
obtaining a reserved transmission resource.

The transmission resource allocated by the second terminal may be indicated to the first sending module 310 through resource allocation information, where the resource allocation information is carried in at least one of the following:
sidelink control information SCI;
sidelink feedback control information SFCI;
a radio resource control (RRC) message;
media access control MAC control element CE; or
information carried by the dedicated sidelink physical channel.

In a specific example, when the second terminal triggers the first terminal to feed back the sidelink assistance information, the second terminal may directly allocate a resource to the first terminal,
where a transmission resource for the sidelink assistance information is associated with a transmission resource (a PSCCH or PSSCH resource) of the second terminal. For example, there is a one-to-one, one-to-many, many-to-one, or many-to-many mapping relationship, or the like as specified in a protocol. In addition, the resource may simultaneously carry the CSI, and the CSI may include channel quality indicator (CQI), precoding matrix indicator (PMI), rank indicator (RI), RSRP, and the like.

In some embodiments,
the first sending module 310 is configured to obtain transmission packet information before resource selection, where the transmission packet information includes at least one of the following:
packet delay budget PDB information of a transmission packet; or a priority of a transmission packet.

The obtaining transmission packet information includes obtaining transmission packet information specified in a protocol, configured or pre-configured by the control node, or obtained according to a rule specified in a protocol.

Figure 5:
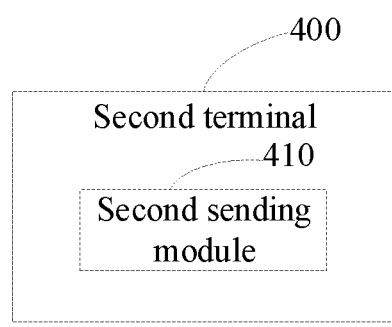
FIG. 5 is a schematic structural diagram of an apparatus for notifying sidelink assistance information by a second terminal side according to an embodiment of this application.

The apparatus for notifying the sidelink assistance information in this embodiment of this application is applied to a second terminal 400, and as shown in FIG. 5, the apparatus includes:

- a second sending module 410, configured to send trigger signaling to a first terminal, to trigger the first terminal to send the sidelink assistance information to the second terminal.

In some embodiments, after the second sending module 410 sends the trigger signaling to the first terminal, to trigger the first terminal for sending, the first terminal sends the sidelink assistance information to the second terminal, and a channel carrying the trigger signaling includes at least one of the following:

- a PSCCH;
- a PSSCH;
- a physical sidelink feedback channel PSFCH; or
- a dedicated sidelink physical channel, where a parameter of the sidelink physical channel includes at least one of the following: an occasion when the channel appears, a time domain resource of the channel, a frequency domain resource of the channel, or a code domain resource of the channel.

In addition, the trigger signaling may only be used to indicate that the second terminal has a new transport block (TB) for sending, instead of directly triggering the first terminal to send the sidelink assistance information. For example, a channel resource carrying the trigger signaling may be a standalone PSCCH (that is, a PSCCH not associated with a PSSCH), a PSCCH or PSSCH with the smallest transmission granularity (that is, a PSSCH or PSCCH with one sub-channel and one slot), and the like.

The occasion when the channel appears may be a time of automatic gain control (AGC) agreed, configured, or pre-configured for several time domain resources (such as several symbols or slots) before or after the occasion when the channel appears.

In addition, channel resources of the sidelink physical channel may also be numbered. For example, the channel resources may be numbered according to a time domain, frequency domain and/or code domain sequence of the channel resources as specified in a protocol or configured or pre-configured by the control node.

In a specific example, as shown in FIG. 7, for a newly defined SL physical channel (such as a PSxCH), channel definition involves at least one of the following parameter items.

(1) An occasion when a channel appears,
including a period of the channel, an offset (for example, an offset relative to SFN #0, DFN #0, or a start position of a resource pool) of the channel, and the like. The parameter item may be a parameter item specified in a protocol or configured or pre-configured by a control node. For example, it is agreed that the occasion when a channel appears is the same as a PSFCH occasion, or the occasion when a channel appears is configured per pool or per BWP.

(2) A time domain resource of a channel, including a length or granularity of the time domain resource, such as the number of symbols. The parameter item is a parameter item specified in a protocol or configured or pre-configured by a control node. For example, it is agreed that the occasion when a channel appears is the same as the number of time domain resources of the PSFCH or has any fixed length, or is configured per pool or per BWP.

(3) A frequency domain resource of a channel, including granularity (such as a physical resource block (PRB), a sub-channel, or the number of resources, or the like). The parameter item is a parameter item specified in a protocol or configured or pre-configured by a control node. A configuration manner may include configuring a frequency domain resource in a "Bitmap" or "start position+length" manner, or a frequency domain resource of the PSxCH is obtained by removing a PSFCH resource on a PSFCH occasion, or a frequency domain resource of the PSxCH is obtained by removing a PSFCH resource on a PSFCH occasion and configuring any one or more other channel resources.

(4) A code domain resource of a channel, code domain resources may be distinguished by cyclic shift, u-v, root sequence, or the like, and the parameter item may be a parameter item specified in a protocol or configured or pre-configured by a control node.

The second sending module 410 is further configured to obtain the transmission resource for the trigger signaling, including at least one of the following:

- obtaining a transmission resource allocated by the control node;
- selecting a transmission resource; or
- continuously transmitting or reserving a transmission resource from a group of selected resources.

That the second sending module 410 selects a transmission resource includes any one of the following:

- using the existing resource selection mode for the PSCCH or PSSCH;
- monitoring a channel resource, obtaining channel resources determined to be in an idle state, and selecting the transmission resource from the resources in the idle state; and
- selecting the transmission resource according to a corresponding identifier of a UE group and/or a UE pair, such as a resource index mod (partial) identifier (ID), where the ID includes a source identifier (Source ID), a destination identifier (destination ID), and a member-ID in a UE group.

In some embodiments, that second sending module 410 monitors a channel resource includes monitoring one group of or multiple groups of channel resources, further including at least any one of the following: the group of channel resources includes channel resources on continuously multiple sidelink physical channel occasions; and inclusion of channel resources included in the group of channel resources has a characteristic as specified in a protocol or configured or pre-configured by the control node. For example, same channel resources on continuously multiple channel occasions are indexed as a group of channel resources; and resources with the same time domain resource and/or frequency domain resource and/or code domain resource on the continuously multiple channel occasions are included in a group of channel resources.

In some embodiments, a channel resource is determined to be in the idle state according to at least one of the following:

- for one resource in a group of channel resources, before determining, on n transmission occasions or continuous n transmission occasions on the group of channel resources, a measured reference signal received power RSRP and/or received signal strength indicator RSSI is less than a preset first threshold, where n is a positive integer;

for one resource in a group of channel resources, before determining, on n transmission occasions or continuous n transmission occasions on the group of channel resources, the number or proportion of resources whose measured RSRP and/or RSSI is less than or equal to a preset second threshold is less than or equal to a preset third threshold; or it is monitored whether a resource is reserved and/or whether a RSRP and/or RSSI value measured on reservation information carrying the resource is less than or equal to a preset fourth threshold.

The n transmission occasions are specified in a protocol or configured or pre-configured by the control node;
the first threshold is specified in a protocol or configured or pre-configured by the control node;
the second threshold is specified in a protocol or configured or pre-configured by the control node;
the third threshold is specified in a protocol or configured or pre-configured by the control node; and
the fourth threshold is specified in a protocol or configured or pre-configured by the control node.

The 'before' includes at least before the moment for determining, before the trigger signaling is transmitted, or the like.

In a specific example, as shown in FIG. 8, for one resource in a group of channel resources, before determining, on continuous n transmission occasions on the group of channel resources, the resource is determined as an idle resource if a measured reference signal received power RSRP is less than a threshold.

In some embodiments, the second sending module 410 is configured to select an idle resource as the transmission resource from multiple idle resources randomly and/or according to a predetermined rule.

In a specific example, as shown in FIG. 9, monitoring a channel resource includes monitoring whether a resource is reserved, or whether a RSRP or RSSI value measured on reservation information carrying the resource is less than or equal to a threshold, where the threshold includes a threshold specified in a protocol (obtained according to a pre-defined rule) or configured or pre-configured by the control node. If a result of the monitoring is 'yes', the resource is determined to be idle. That the second terminal selects a resource includes at least that the second terminal selects a resource from multiple idle resources randomly or according to a predetermined rule.

The second terminal may continuously transmit or reserve a transmission resource from a group of selected resources, for example, the second terminal may perform transmission or reservation for continuous m times, where m may be specified in a protocol or configured or pre-configured by the control node. For a reserved resource, resource reservation information may be carried in trigger signaling. For example, the reservation information indicates the number of times for which the second terminal has reserved resources, or indicates whether the second terminal is performing resource reservation. In addition, the resource may simultaneously carry channel state information (CSI) trigger signaling or HARQ feedback trigger signaling.

In some embodiments, joint coding or separate coding may be used for the trigger signaling.

In some embodiments, the second sending module 410 is further configured to obtain transmission packet information before resource selection, where the transmission packet information includes at least one of the following:
packet delay budget PDB information of a transmission packet; or a priority of a transmission packet.

The obtaining transmission packet information includes obtaining transmission packet information specified in a protocol, configured or pre-configured by the control node, or obtained according to a rule specified in a protocol.

The apparatus for notifying sidelink assistance information in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a Network Attached Storage (NAS), a personal computer (PC), a television (TV), a counter, or a self-service machine. This is not specifically limited in this embodiment of this application.

The apparatus for notifying sidelink assistance information in this embodiment of this application may be an apparatus with an operating system. The operating system may be an Android operating system, may be an iOS operating system, or may be another possible operating system, which is not specifically limited in the embodiments of this application.

The apparatus for notifying sidelink assistance information provided in this embodiment of this application can implement processes of the method for notifying sidelink assistance information in the method embodiment of FIG. 2 or FIG. 3. To avoid repetition, details are not described herein again.

An embodiment of this application further provides an electronic device, including a processor, a memory, and a program or an instruction stored in the memory and capable of running on the processor. When the program or the instruction is executed by the processor, the processes of the foregoing embodiments of the method for notifying sidelink assistance information are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 6:
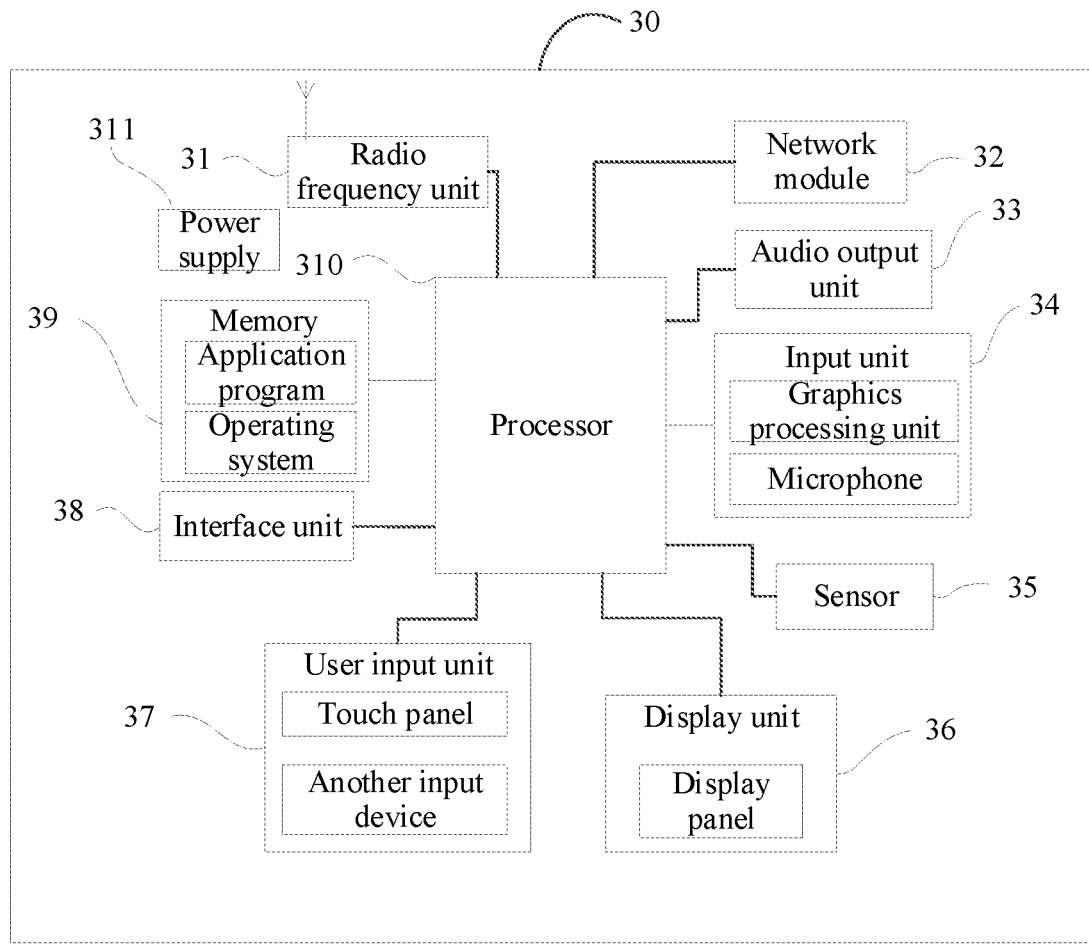
FIG. 6 is a block diagram of a terminal according to an embodiment of this application.

The electronic device in this embodiment may be a terminal. FIG. 6 is a schematic diagram of a hardware structure of a terminal according to the embodiments of this application. A terminal 30 includes but is not limited to components such as a radio frequency unit 31, a network module 32, an audio output unit 33, an input unit 34, a sensor 35, a display unit 36, a user input unit 37, an interface unit 38, a memory 39, a processor 310, and a power supply 311. It can be understood by a person skilled in the art that, the terminal structure shown in FIG. 6 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 31 may be configured to receive and send information or a signal in a call process. In some embodiments, after receiving downlink data from a base station, the radio frequency unit 31 sends the downlink data to the processor 310 for processing. In addition, the radio frequency unit 31 sends uplink data to the base station. Usually, the radio frequency unit 31 includes but is not limited to an antenna, at least one amplifier, a transceiver, a coupler, a low noise amplifier, a duplexer, and the like. In addition, the radio frequency unit 31 may further communicate with a network and another device through a wireless communications system.

The memory 39 may be configured to store a software program and various pieces of data. The memory 39 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 39 may include a high-speed random access memory, and may further include a nonvolatile memory, for example, at least one magnetic disk storage device, a flash storage device, or another volatile solid-state storage device.

The processor 310 is a control center of the terminal, and connects all parts of the entire terminal by using various interfaces and lines. By running or executing a software program and/or a module stored in the memory 39 and invoking data stored in the memory 39, the processor 310 performs various functions of the terminal and data processing, to perform overall monitoring on the terminal. The processor 310 may include one or more processing units. In some embodiments, an application processor and a modem processor may be integrated into the processor 310. The application processor mainly processes an operating system, a user interface, an application, and the like. The modem processor mainly processes wireless communications. It can be understood that, for example, the modem processor may not be integrated into the processor 310.

The terminal 30 may further include the power supply 311 (such as a battery) that supplies power to each component. In some embodiments, the power supply 311 may be logically connected to the processor 310 by using a power management system, so as to implement functions such as charging, discharging, and power consumption management by using the power management system.

In addition, the terminal 30 includes some function modules not shown, and details are not described herein.

An embodiment of this application further provides a readable storage medium, where the readable storage medium stores a program or an instruction, and when the program or the instruction is executed by a processor, processes of the foregoing embodiments of the method for notifying sidelink assistance information are implemented, and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application also provides a chip. The chip includes a processor and a communications interface, and the communications interface is coupled to the processor. The processor is configured to run a program or an instruction to implement processes of the foregoing embodiments of the method for notifying sidelink assistance information, and a same technical effect can be achieved. To avoid repetition, details are not described herein again.

It should be understood that the chip mentioned in this embodiment of this application may also be referred to as a system-level chip, a system chip, a system on chip, a system-on-a-chip chip, and the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

It should be noted that, it should be understood that division of modules is merely logical function division. The modules may be all or partially integrated in a physical entity or may be physically separate in actual implementation. In addition, all these modules may be implemented in a form of software by invoking a processing element; or all these modules may be implemented in a form of hardware; or some modules may be implemented in a form of software by invoking a processing element, and some modules are implemented in a form of hardware. For example, the determining module may be a separately disposed processing element, or may be integrated into a chip of the foregoing apparatus for implementation. In addition, the determining module may be stored in a memory of the foregoing apparatus in a form of program code, and a processing element of the foregoing apparatus invokes and executes a function of the determining module. The implementations of other modules are similar thereto. In addition, all or some of these modules may be integrated together or implemented independently. The processing element herein may be an integrated circuit having a signal processing capability. During implementation, various steps of the foregoing method or the foregoing modules may be completed through an integrated logic circuit of the hardware in the processor element or a command in the form of software.

For example, each module, unit, subunit, or submodule may be one or more integrated circuits configured to implement the foregoing method, for example, one or more Application Specific Integrated Circuit (ASIC), or one or more microprocessors (digital signal processor, DSP), or one or more Field Programmable Gate Array (FPGA). For another example, when one of the foregoing modules is implemented in the form of program code being scheduled by a processing element, the processing element may be a general-purpose processor, such as a Central Processing Unit (CPU) or another processor that can invoke program code. For another example, the modules may be integrated in a form of a system-on-a-chip (SOC) for implementation.

In the specification and claims of the present disclosure, the terms "first", "second", and the like are intended to distinguish between similar objects but do not necessarily describe a specific order or sequence. It should be understood that such used data is exchangeable in a proper case, so that the embodiments of the present disclosure described herein, for example, can be implemented in sequences other than those shown in the figures or described herein. In addition, terms "include", "have", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in the specification and claims, "and/or" is used to indicate at least one of connected objects, for example, A and/or B and/or C indicates seven cases: only A, only B, only C, both A and B, both B and C, both A and C, and A, B and C. Similarly, "at least one of A and B" used in this specification and claims should be understood as "only A, only B, or both A and B".

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for notifying sidelink assistance information, performed by a first terminal, comprising:
   sending the sidelink assistance information to a second terminal when a preset trigger condition is satisfied,
   wherein the trigger condition comprises at least one of the following:
   the first terminal detects a transmission resource reserved by the second terminal; or
   the first terminal detects that a transmission resource of the second terminal and a transmission resource of the first terminal overlap,
   wherein the sidelink assistance information is sent to the second terminal at a preset time position before a time position at which the reserved transmission resource is located, wherein a time duration between the reset time position and the time position at which the reserved transmission resource is located has a minimum time duration value x specified in a protocol, or configured or pre-configured by a control node.

2. The method according to claim 1, wherein the sidelink assistance information is sent to the second terminal at a preset time position after a time position at which the preset trigger condition is satisfied, wherein a time duration between the preset time position and the time position at which the reset trigger condition is satisfied has a minimum time duration value y specified in a protocol, or configured or pre-configured by a control node.

3. The method according to claim 1, wherein the trigger condition further comprises at least one of the following:
   the first terminal determines that demodulation fails; or
   a constraint condition is satisfied, wherein the constraint condition is specified in a protocol, or configured or pre-configured by a control node.

4. The method according to claim 3, wherein the first terminal determines that demodulation fails comprises at least one of the following:
   demodulation of initial transmission of a physical sidelink control channel (PSCCH) or a physical sidelink shared channel (PSSCH) of the second terminal fails;
   demodulation of retransmission of a PSCCH or PSSCH of the second terminal fails;
   demodulation of a specific PSCCH or PSSCH fails;
   demodulation of a transmission resource of a specific transport block (TB) fails; or
   demodulation of a resource with a specific sidelink grant (SL) grant fails.

5. The method according to claim 3, wherein the first terminal sends the sidelink assistance information to the second terminal after the first terminal determines that the demodulation fails n times, wherein n is a positive integer.

6. The method according to claim 3, further comprising:
   obtaining a, constraint condition for sending the sidelink assistance information, wherein the constraint condition is specified in a protocol, or configured or pre-configured by the control node, or sent by the second terminal, wherein the constraint condition comprises a sending frequency or a sending interval at which the sidelink assistance information is sent.

7. The method according to claim 6, wherein when the constraint condition is configured or pre-configured by the control node, the constraint condition is for any one of the following objects: a resource pool, a bandwidth part, or a terminal.

8. The method according to claim 1, wherein a channel carrying the sidelink assistance information comprises at least one of the following:
   a PSCCH;
   a PSSCH;
   a PSFCH; or
   a dedicated sidelink physical channel, wherein a parameter of the dedicated sidelink physical channel comprises at least one of the following: an occasion when the channel appears, a time domain resource of the channel, a frequency domain resource of the channel, or a code domain resource of the channel.

9. The method according to claim 8, further comprising: numbering channel resources of the dedicated sidelink physical channel.

10. The method according to claim 8, wherein the method further comprises obtaining a transmission resource for the sidelink assistance information, comprising any one of the following:
    the first terminal obtaining a transmission resource allocated by the control node;
    the first terminal selecting a transmission resource;
    the first terminal obtaining a transmission resource allocated by the second terminal; or
    the first terminal obtaining a reserved transmission resource.

11. The method according to claim 10, wherein the transmission resource allocated by the second terminal is indicated to the first terminal through resource allocation information, wherein the resource allocation information is carried in at least one of the following:
sidelink control information (SCI);
sidelink feedback control information (SFCI);
a radio resource control (RRC) message;
media access control (MAC) control element (CE); or
information carried by the dedicated sidelink physical channel.

12. The method according to claim 10, wherein the transmission resource for the sidelink assistance information is associated with a transmission resource of the second terminal.

13. The method according to claim 10, wherein that the first terminal selects a transmission resource comprises:
obtaining transmission packet information before resource selection, wherein the transmission packet information comprises at least one of the following:
packet delay budget (PDB) information of a transmission packet; or
a priority of a transmission packet.

14. The method according to claim 13, wherein the obtaining transmission packet information comprises obtaining transmission packet information specified in a protocol, configured or pre-configured by the control node, or obtained according to a rule specified in a protocol.

15. An electronic device, wherein the electronic device is a first electronic device, comprising:
a memory storing a computer program; and
a processor coupled to the memory and configured to execute the computer program to perform operations comprising:
sending sidelink assistance information to a second electronic device when a preset trigger condition is satisfied,
wherein the trigger condition comprises at least one of the following:
the first electronic device detects a transmission resource reserved by the second electronic device; or
the first electronic device detects that a transmission resource of the second electronic device and a transmission resource of the first electronic device overlap,
wherein the sidelink assistance information is sent to the second terminal at a preset time position before a time position at which the reserved transmission resource is located, wherein a time duration between the preset time position and the time position at which the reserved transmission resource is located has a minimum time duration value x specified in a protocol, or configured or pre-configured by a control node.

16. The electronic device according to claim 15, wherein the sidelink assistance information is sent to the second terminal at a preset time position after a time position at which the preset trigger condition is satisfied, wherein a time duration between the preset time position and the time position at which the preset trigger condition is satisfied has a minimum time duration value y specified in a protocol, or configured or pre-configured by a control node.

17. The electronic device according to claim 15, wherein the trigger condition further comprises at least one of the following:
the first electronic device determines that demodulation fails; or
a constraint condition is satisfied, wherein the constraint condition is specified in a protocol, or configured or pre-configured by a control node.

18. The electronic device according to claim 17, wherein the first electronic device determines that demodulation fails by determining at least one of the following:
demodulation of initial transmission of a physical sidelink control channel (PSCCH) or a physical sidelink shared channel (PSSCH) of the second electronic device fails;
demodulation of retransmission of a PSCCH or PSSCH of the second electronic device fails:
demodulation of a specific PSCCH or PSSCH fails;
demodulation of a transmission resource of a specific transport block (TB) fails; or
demodulation of a resource with a specific sidelink grant (SL) grant fails.

19. The electronic device according to claim 17, wherein the first electronic device sends the sidelink assistance information to the second electronic device after the first electronic device determines that the demodulation fails n times, wherein n is a positive integer.

20. A non-transitory computer-readable storage medium, storing a computer program, wherein the computer program, when executed by a processor of a first electronic device, causes the processor to perform operations comprising:
sending sidelink assistance information to a second electronic device when a preset trigger condition is satisfied,
wherein the trigger condition comprises at least one of the following:
the first electronic device detects a transmission resource reserved by the second electronic device; or
the first electronic device detects that a transmission resource of the second electronic device and a transmission resource of the first electronic device overlap,
wherein the sidelink assistance information is sent to the second terminal at a preset time position before a time position at which the reserved transmission resource is located, wherein a time duration between the preset time position and the time position at which the reserved transmission resource is located has a minimum time duration value x specified in a protocol, or configured or pre-configured by a control node.

* * * * *